(12) United States Patent
Kimball et al.

(10) Patent No.: US 6,963,835 B2
(45) Date of Patent: Nov. 8, 2005

(54) CASCADED HIDDEN MARKOV MODEL FOR META-STATE ESTIMATION

(75) Inventors: Steven F. Kimball, Auburn, NH (US); Joanne Como, Chichester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 108 days.

(21) Appl. No.: 10/403,405

(22) Filed: Mar. 31, 2003

(65) Prior Publication Data

US 2004/0193419 A1    Sep. 30, 2004

(51) Int. Cl.[7] .............................................. G10L 15/00
(52) U.S. Cl. ...................................... 704/235; 704/246
(58) Field of Search ............................... 704/235, 246, 704/256

(56) References Cited

U.S. PATENT DOCUMENTS

| | | | |
|---|---|---|---|
| 5,530,950 A | * | 6/1996 | Medan et al. ............ 379/88.24 |
| 5,594,834 A | * | 1/1997 | Wang ......................... 704/253 |
| 5,812,973 A | * | 9/1998 | Wang ......................... 704/253 |

OTHER PUBLICATIONS

PCT International Search Report dated Jan. 14, 2005 of International Application No. PCT/US04/09719 filed Mar. 30, 2004.

* cited by examiner

*Primary Examiner*—Daniel Abebe
(74) *Attorney, Agent, or Firm*—Barry L. Haley; Daniel J. Long

(57) ABSTRACT

A method and system for training an audio analyzer (114) to identify asynchronous segments of audio types using sample data sets, the sample data sets being representative of audio signals for which segmentation is desired. The system and method then label asynchronous segments of audio samples, collected at the target site, into a plurality of categories by cascading hidden Markov models (HMM). The cascaded HMMs consist of 2 stages, the output of the first stage HMM (208) being transformed and used as observation inputs to the second stage HMM (212). This cascaded HMM approach allows for modeling processes with complex temporal characteristics by using training data. It also contains a flexible framework that allows for segments of varying duration. The system and method are particularly useful in identifying and separating segments of the human voice for voice recognition systems from other audio such as music.

34 Claims, 7 Drawing Sheets

US 6,963,835 B2

CASCADED HIDDEN MARKOV MODEL FOR META-STATE ESTIMATION

BACKGROUND OF THE INVENTION

1. Field of the Invention

This invention generally relates to the field of speech recognition, and more particularly relates to a system and method for segmenting audio signals into different classes that separate segments of voice activity from silence and tones in order to more accurately transcribe speech.

2. Description of Related Art

The process of automatic voice recognition and transcription has gained tremendous popularity-and importance in recent years. Today, voice recognition techniques are used in numerous applications such as closed captioning, speech dictation, and surveillance.

In automated speech recognition, the ability to separate segments of voice activity from other audio has become increasingly important as the desire to apply automatic voice processing to real world audio signals increases. Often, these types of audio signals consist of voice segments interspersed with segments of silence and other sounds such as tones or music. Certain anomalies within a segment of audio signals, such as a random burst of noise, silence, or music will cause errors when attempting to process or transcribe the speech segments. Therefore, prior to automatic processing of these voice segments, they must first be separated from the other audio.

Hidden Markov models (HMM) are commonly used to model random processes such as speech production. Others have tried segmenting speech and music with a single (HMM) using minimum duration constraints. However, with these methods there is a need to know the duration of the different segments beforehand. They also do not allow for segments smaller than the predetermined duration.

Therefore a need exists to overcome the problems with the prior art as discussed above, and particularly for a system and method for segmenting audio into different classes in order to more accurately transcribe speech.

SUMMARY OF THE INVENTION

A method and system for training an audio analyzer to identify asynchronous segments of different types of audio signals using sample data sets, the sample data sets being representative of the different types of audio signals to be separated. The system and method then label segments of audio samples collected from an unlabeled source, into a plurality of categories by cascading hidden Markov models (HMM). The cascaded HMMs consist of 2 stages, the output of the first stage HMM being transformed and used as observation inputs to the second stage HMM. This cascaded HMM approach allows for modeling processes with complex temporal characteristics by using training data. It also contains a flexible framework that allows for segments of varying duration.

Training files are used to create models of the signal types seen by the audio analysis system. Currently three models are built: voice, silence and signals (such as tones). The framework is such that other models can be added without many modifications to the software.

DESCRIPTION OF THE PREFERRED EMBODIMENTS

The present invention, according to a preferred embodiment, overcomes problems with the prior art by using the transformed output of one synchronous observer HMM as the input to another HMM which models the event sequence and duration. This cascaded HMM approach allows for modeling processes with complex temporal characteristics by using training data. It also contains a flexible framework that allows for segments of varying duration.

In speech recognition, the HMM is typically looking to estimate the state of the speakers vocal tract so that a match to a phonetic pattern can be established. The time scale of these events is on the order of 10 msec–200 msec. Popular features, such as Linear Predictive Coding (LPC) coefficients or Cepstral coefficients, are typically extracted on frames of speech data at regular intervals of 10 msec to 25 msec. Thus the quasi-stable state duration is on the order of 1–20 observation frames. In the speech segmentation problem, what is desired is an estimate of a meta-state of the channel, i.e. not the details of the activity of the speaker's vocal tract, but the presence of a speaker. This type of state information is quasi-stable on the order of 2 sec–-60 sec or more (even hours in the case of music) but generally not less. Due to the assumption of a Markov process, an HMM cannot accurately model the probability distribution of quasi-stable state intervals that have a higher probability of occurrence for longer periods of quasi-stability than for shorter periods.

The Cascaded HMM is a technique for separating voice segments from other audio using a 2 stage hidden Markov model (HMM) process. The first stage contains an HMM which segments the data at the frame level into a multiplicity of states corresponding to the short duration hidden sub-states of the meta-states (voice, silence or signal). This is a fine grain segmentation that is not well matched to the time scales of the desired meta-state information, since these transmissions may contain short periods of silence or signal and the HMM is unable to accurately model the lower probability of these short events. To overcome this, the output of the first HMM is modified to explicitly incorporate the timing and state information encoded in the state sequence. The modified output is then used as the input to a second HMM that is trained to recognize the meta-state of the channel.

Figure 1:
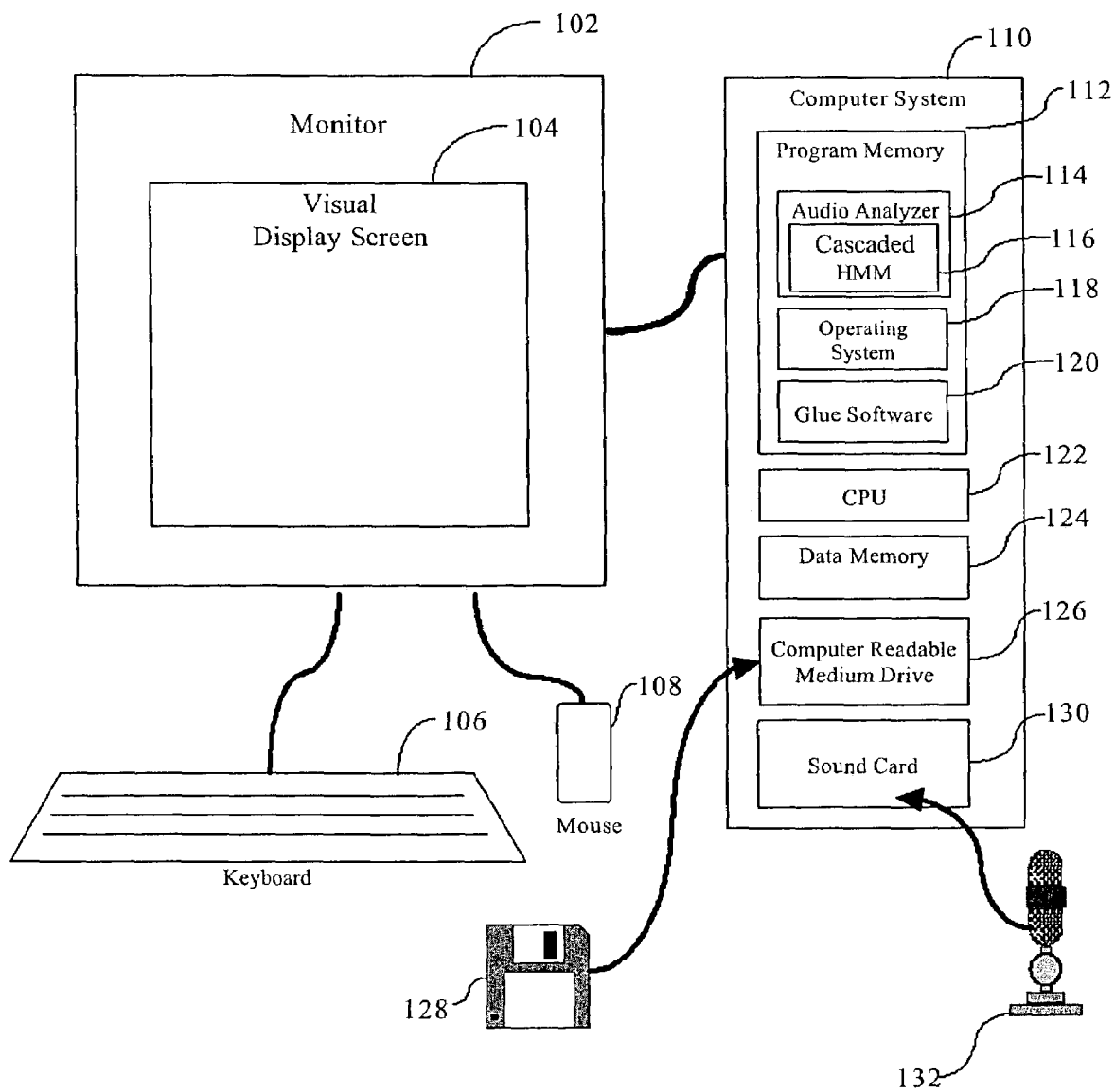
FIG. 1 is a block diagram illustrating an audio analysis system using cascaded hidden Markov models (HMM's) for meta-state estimation, according to a preferred embodiment of the present invention.
Figure 2:
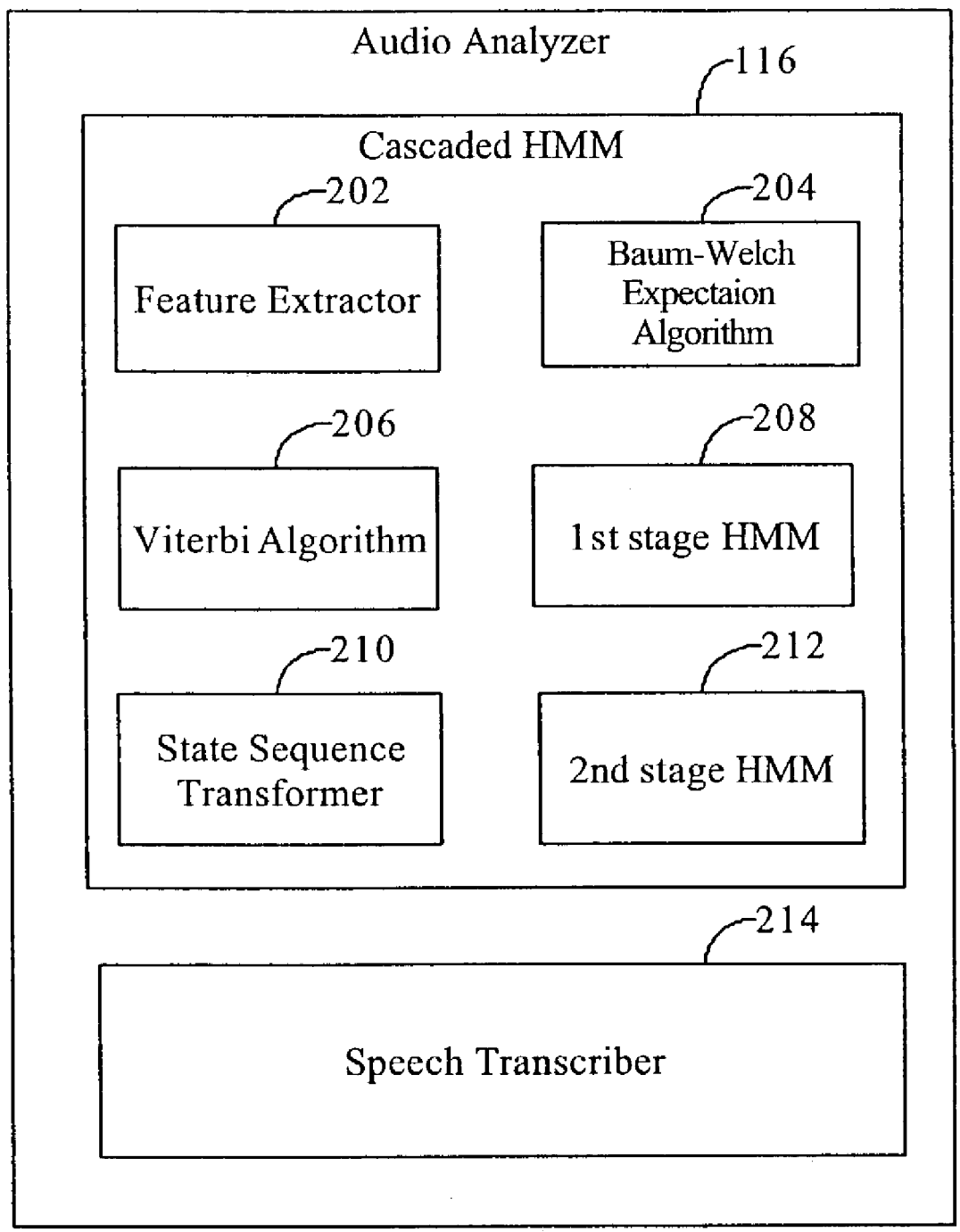
FIG. 2 is a more detailed block diagram showing an exemplary audio analyzer in the system of FIG. 1, according to a preferred embodiment of the present invention.
Figure 3:
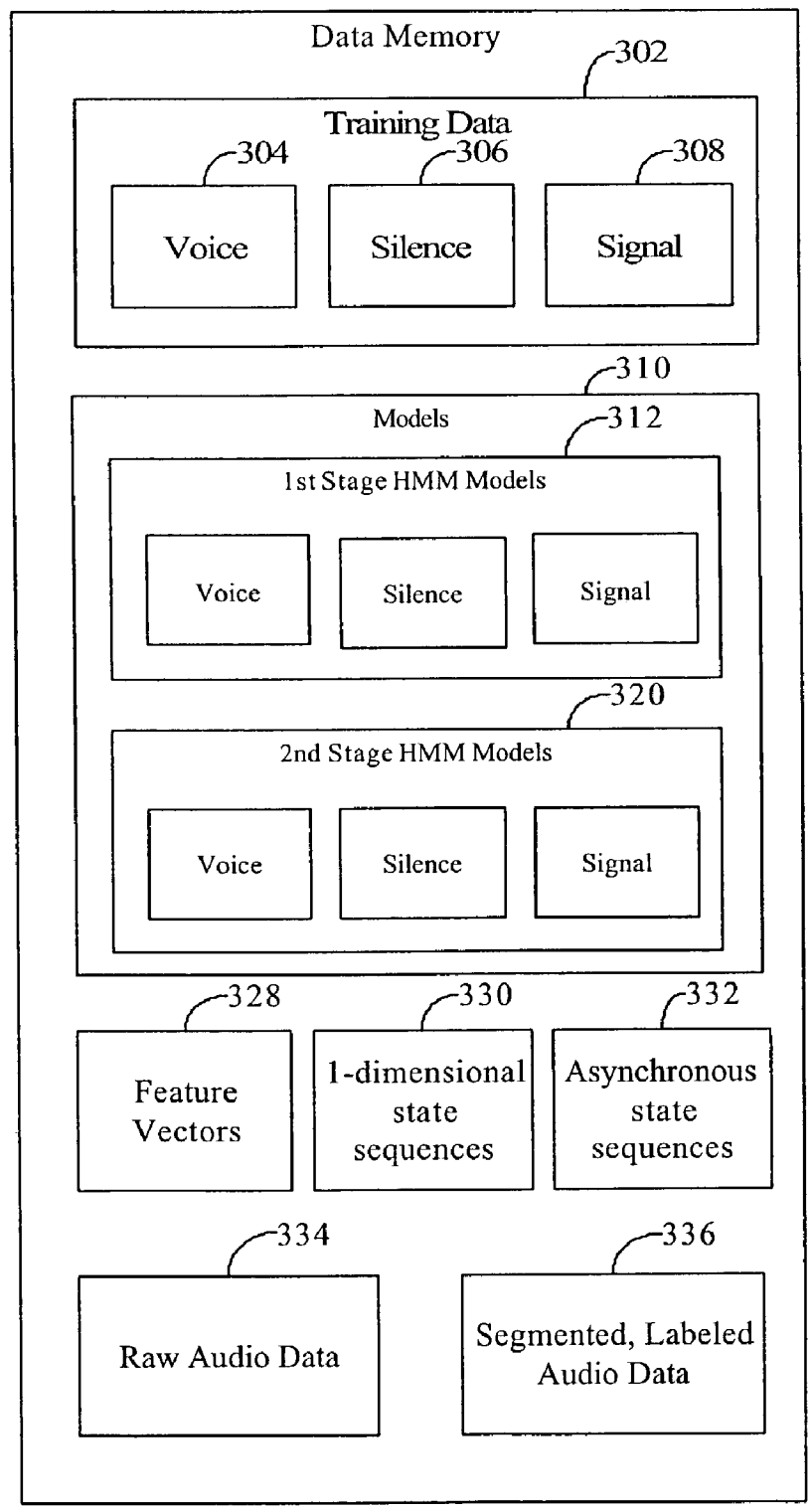
FIG. 3 is a more detailed block diagram showing an exemplary data memory of the system of FIG. 1, according to a preferred embodiment of the present invention.

FIGS. 1, 2 and 3 illustrate an exemplary audio analysis system using cascaded hidden Markov models (HMM's) for meta-state estimation according to a preferred embodiment of the present invention. The audio analysis system 100 includes a computer system 110, having an audio analyzer 114 that includes a cascaded HMM 116. The computer system 110, according to the present example, includes a controller/processor 122, which processes instructions, performs calculations, and manages the flow of information through the computer system 110. Additionally, the controller/processor 122 is communicatively coupled with program memory 112. Included within program memory 112 are an audio analyzer 114 including a cascaded HMM 116 (which will be discussed in later in greater detail), an operating system platform 118, and glue software 120. The audio analyzer 114 contains a cascaded HMM 116, and optionally, a speech transcriber 214. The cascaded HMM 116 includes a feature extractor 202, a 1st stage HMM 208 and a 2nd stage HMM 212, both of which use a Baum-Welch expectation maximization algorithm 204 to estimate HMM model parameters 310 from training data 302 and use a Viterbi algorithm 206 to determine the most likely path through the HMM, and a state sequence transformer 210 to transform the state sequence 330 generated by the 1st HMM 208 into a discrete state sequence 332 that incorporates both the state label and state duration information from 208. The operating system platform 118 manages resources, such as the data stored in data memory 124, the scheduling of tasks, and processes the operation of the audio analyzer 114 in the program memory 112. The operating system platform 118 also manages a graphical display interface (not shown) which displays information via a visual display screen 104 included in a computer monitor 102, a user input interface (not shown) that receives inputs from the keyboard 106 and the mouse 108, and communication network interfaces (not shown) for communicating with a network link (not shown). Additionally, the operating system platform 118 also manages many other basic tasks of the computer system 110 in a manner well known to those of ordinary skill in the art.

Glue software 120 may include drivers, stacks, and low level application programming interfaces (API's) and provides basic functional components for use by the operating system platform 118 and by compatible applications that run on the operating system platform 118 for managing communications with resources and processes in the computing system 110.

Each computer system 110 may include, inter alia, one or more computers and at least a computer readable medium 128. The computers preferably include means 126 for reading and/or writing to the computer readable medium 128. The computer readable medium 128 allows a computer system 110 to read data, instructions, messages or message packets, and other computer readable information from the computer readable medium. The computer readable medium, for example, may include non-volatile memory, such as Floppy, ROM, Flash memory, disk drive memory, CD-ROM, and other permanent storage. It is useful, for example, for transporting information, such as data and computer instructions, between computer systems.

A microphone 132 is used for collecting audio signals in analog form, which are digitized (sampled) by an analog to digital converter (ADC) (not shown), typically included onboard a sound card 130. These sampled signals, or any audio sample already in a digital format (i.e. audio files using .wav, .mp3, etc . . . formats) may be used as input to the Feature Extractor 202.

A preferred embodiment of the present invention consists of two phases, a training phase and an identification/segmentation phase. The training phase will occur in non real-time in a laboratory using data sets which are representative of that seen from sources for which segmentation is desired. These training files are used to create models of the signal types seen by the audio analysis system. Currently three models are built: voice, silence and signals (such as tones). The framework is such that other models can be added without many modifications to the software. Once the models have been created, they can be loaded by the real-time segment and used to attempt to classify and segment the incoming audio.

The training and identification/segmentation phases of the method are performed using a technique called "Cascaded Hidden Markov Model (HMM)". This technique consists of two HMMs, where the transformed output of the first is used as the input to the second. These models are built using audio segments from the training data.

This technique overcomes two weaknesses of the standard HMM in modeling longer duration segments. The first weakness of the HMM in modeling larger segments is the assumption that observations are conditionally independent. The second is that state duration is modeled by an exponential decay. The Cascaded HMM method associates states with feature vector sequences rather than with individual observations, allowing for the modeling of acoustically similar segments of variable duration.

Figure 4:
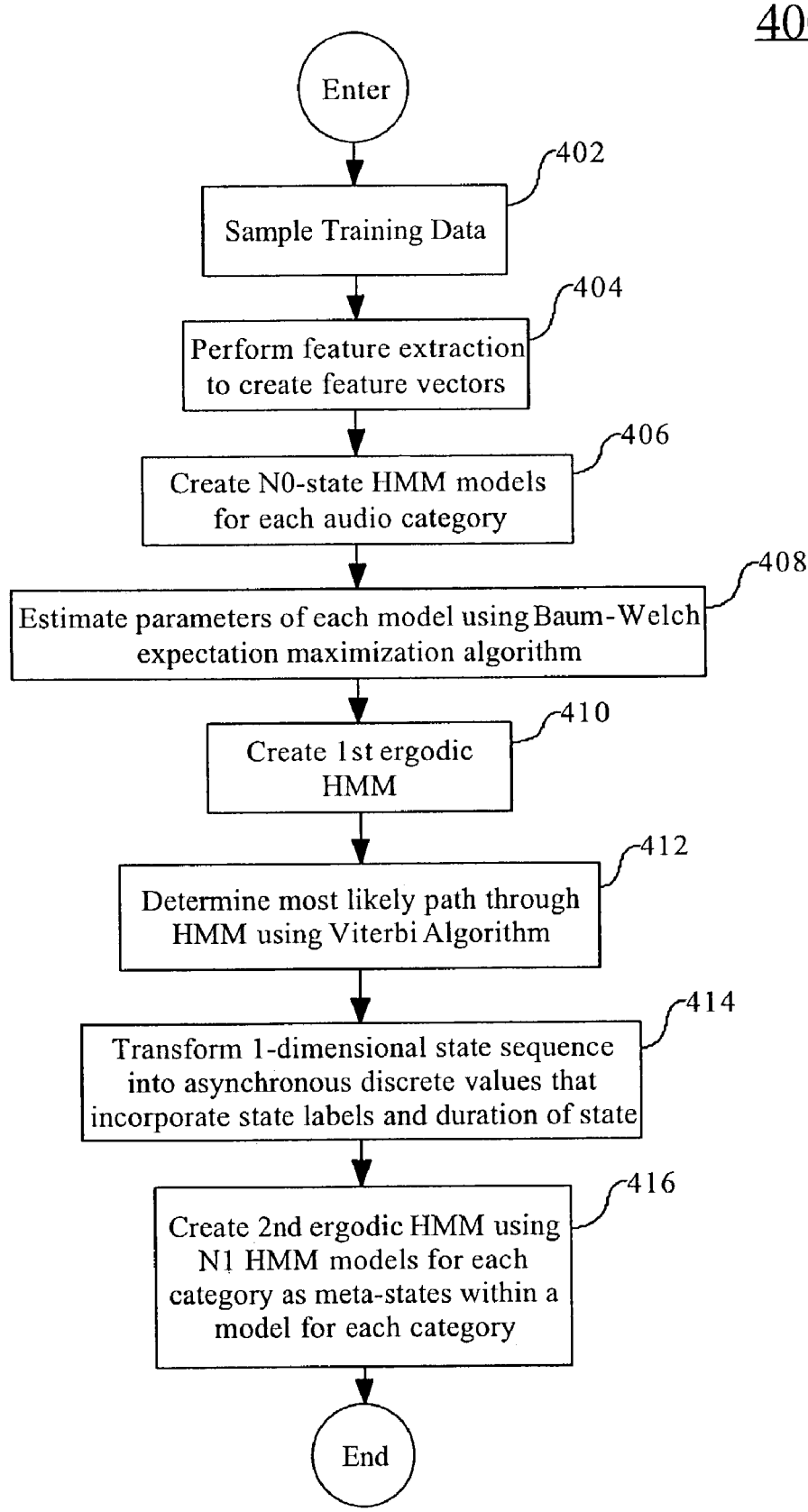
FIGS. 4 and 5 are operational flow diagrams describing exemplary operational sequences of the audio analyzer of FIG. 2, according to a preferred embodiment of the present invention.

The method, as shown in FIG. 4, takes in a discrete sampled time domain signal at step 402. For example, the audio signal may be sampled at 48 kHz with a 16-bit linear A/D converter. The time domain signal is then decimated by a factor of 6 yielding data at a sample-rate of 8 kHz. The time domain signal is transformed into a feature vector 328, at step 404. The feature vector 328 represents various characteristics of the signal over a short observation interval called a frame. The frame is short relative to a typical voice segment; so, many vectors are collected over the duration of a segment. The entire collection of feature vectors 328 for each of the segments is used for the subsequent training and identification/segmentation process.

Ideal features should help discriminate between the different classes of signals to be identified and segmented. In the preferred embodiment, the feature vector 328 consists of three fields relating to the following features:

1. autocorrelation error—indicates degree of voicing in signal.

2. harmonicity (evidence of formants) between 3 and 5 strongest spectral peaks to discriminate between voice and noise.

3. tone identification—indicates presence of tones based on (a) frequency and (b) amplitude consistency criteria.

Other embodiments using different numbers of data fields and different observation techniques for those fields have also been contemplated and put into practice.

Figure 6:
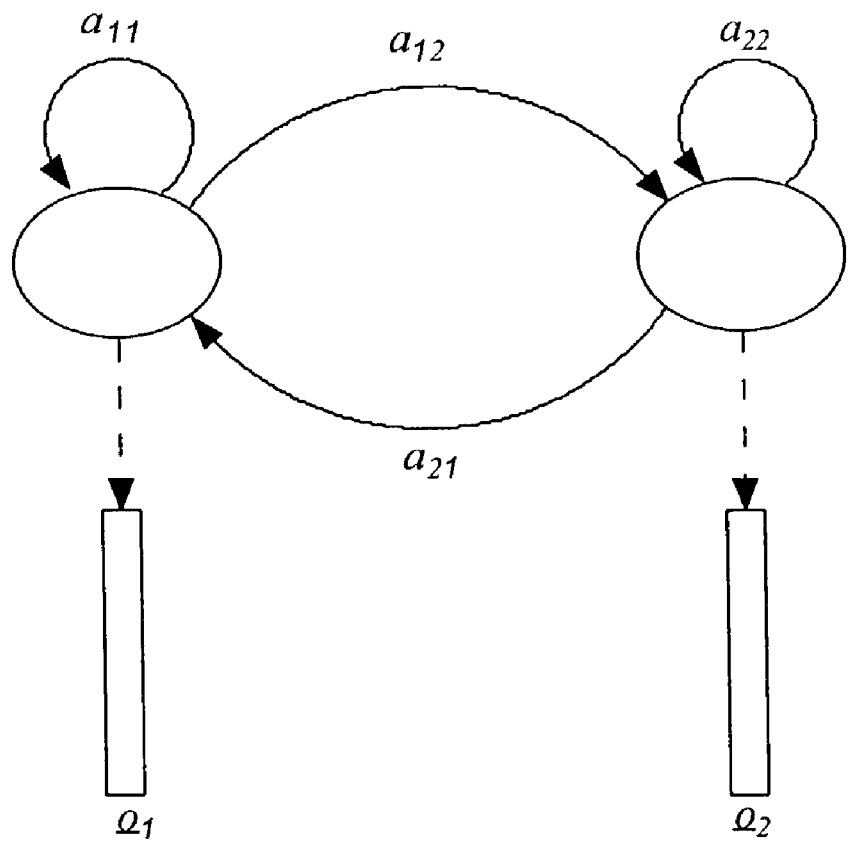
FIG. 6 is a state diagram illustrating a two state ergodic HMM with Gaussian emission probabilities, according to a preferred embodiment of the present invention.
Figure 6:
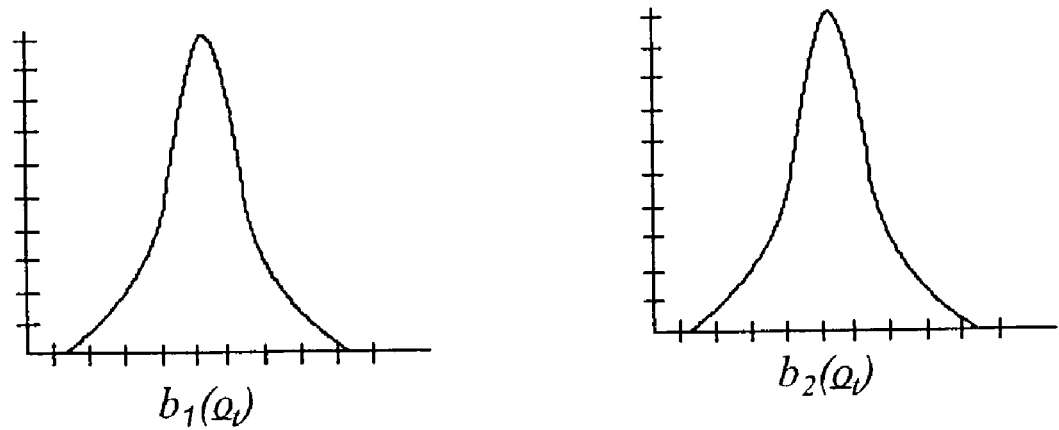

During the training phase, the training audio data is labeled into 3 categories (voice, silence, signal) at a coarse level of detail (i.e. a voice transmission which may contain short silences is all labeled as voice, provided it is all part of the same transmission). Feature extraction is preferably performed at a 10 msec frame interval. Each feature vector 328 is used as an observation input to the 1st stage HMM 208. The collection feature vectors 328 for each category, at step 406, are analyzed to produce a statistical model 312 for each of the segment types. The model used is multi-state ergodic hidden Markov model (HMM) with the observation probabilities (emission probability density) for each state modeled by a Gaussian probability density as shown in FIG. 6. The number of states is chosen to optimize performance with a particular application. Two (2), three (3), and higher values have all been contemplated and put into practice. For clarity, the number of states in the first stage HMM for each meta-state is referred to as N0.

Figure 7:
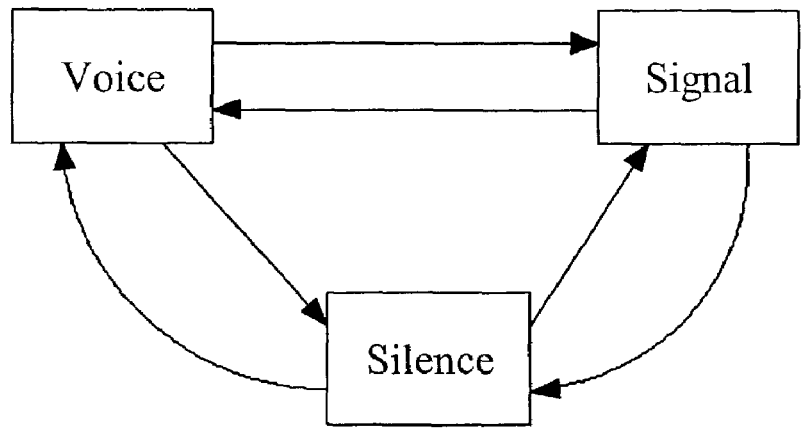
FIG. 7 is a state diagram showing an exemplary first stage HMM, according to a preferred embodiment of the present invention.

The Baum-Welch expectation. maximization (EM) algorithm 204 is used at step 408 to estimate the parameters of the models. Once a model for each category is built, they are combined, at step 410, into a multi-state ergodic HMM 208 as shown in FIG. 7 (i.e. each box in FIG. 7 contains an N0-state model as shown in FIG. 6). The transition probabilities between the categories may be manually set to appropriate values based on expert knowledge or estimated from the training data. This results in the $1^{st}$ HMM model that will have three times N0 output states. The number of output states of the $1^{st}$ HMM will be referred to as N1. This HMM 208 is used to segment the data at the frame level into discrete states corresponding to the hidden sub-states of the $1^{st}$ HMM. This is accomplished by performing a Viterbi search, at step 412, to determine the most likely path through the HMM 208.

The input to the second HMM 212 is formed using the state sequence generated by the first HMM 208. The state sequence is transformed, at step 414, from a synchronous sequence of state labels, to an asynchronous sequence of discrete values encoding the first HMM state label and the duration of the state (i.e. number of repeats).

Figure 8:
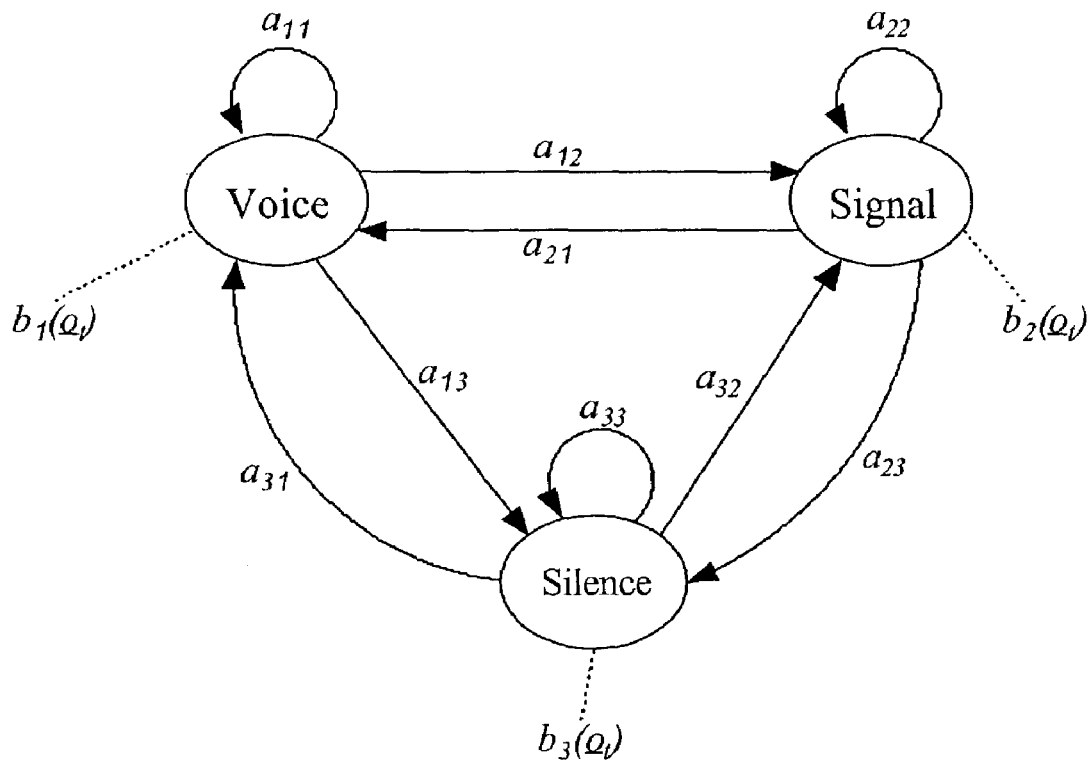
FIG. 8 is a state diagram showing exemplary sub-states of the second stage HMM, according to a preferred embodiment of the present invention.

The second stage HMM 212 is now able to model the meta-state duration explicitly, overcoming the sequence length constraint in a single HMM with synchronous input. The same truth meta-state labeling is used to build models for speech segments, silence segments and signal segments. Each of these models contains 3 states; one for each of the three categories modeled above, with N1 sub-states each. The states are the same as that of the first stage shown in FIG. 7, except that there are N1 sub-states (shown in FIG. 8) contained in each of the larger states. This is to allow for the event that a segment of one category contains frames of another category (i.e. a voice segment contains a short burst of noise in the middle). The emission probability of each of the states models the duration of that state in the segment. This enables the modeling of a segment as a sequence of observations. These models are combined, at step 416, to create an HMM 212 of the channel (the meta-state).

Figure 5:
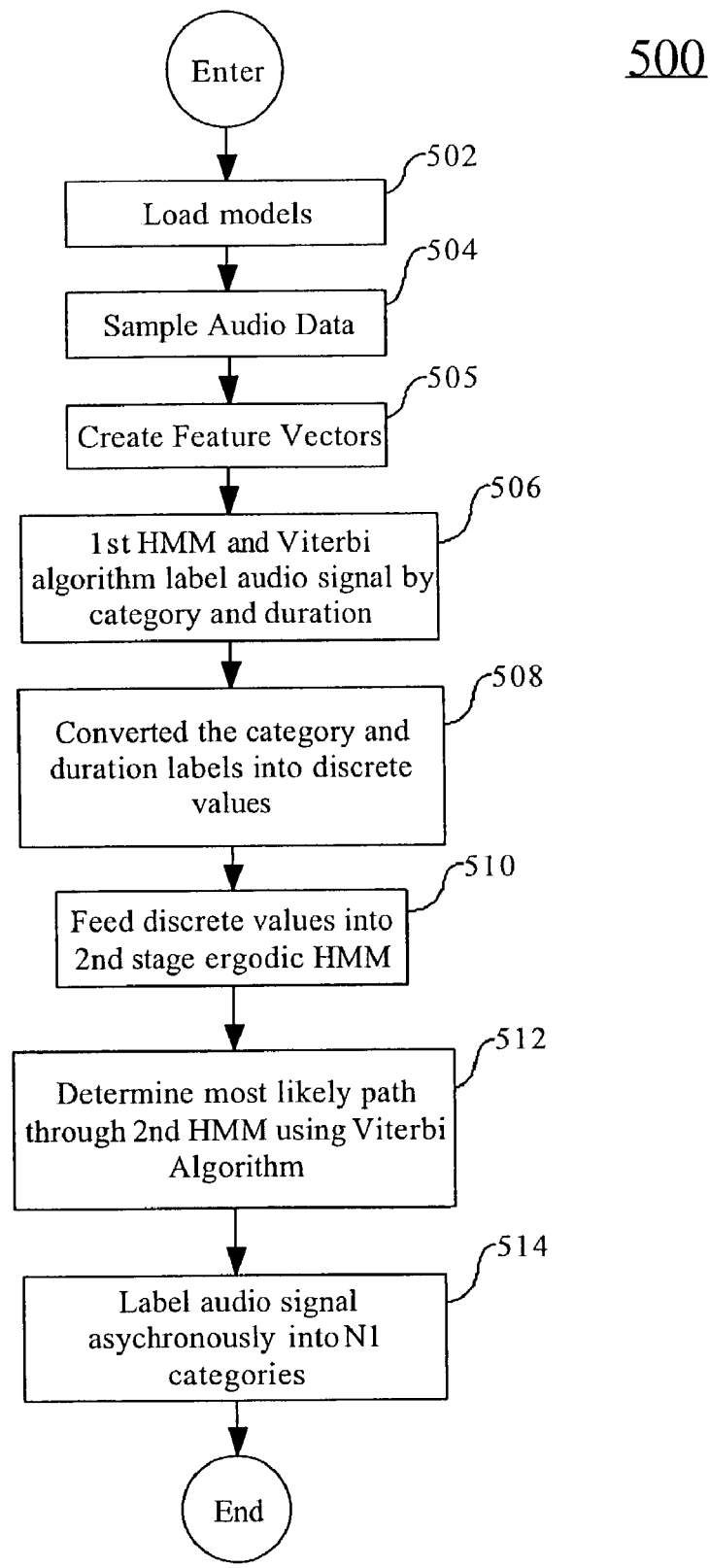

Once the HMMs are trained, segmentation of audio signals can be performed, as shown in FIG. 5. The models created during the training stage are loaded, at step 502, and used for testing. The raw audio signal 334 is sampled at step 504, the feature vectors 328 created at step 505, and then labeled according to category and duration by the first stage HMM 208 using the Viterbi algorithm 206 and the HMM of the first stage 208 at step 506. The category and duration labels are then converted into discrete values, at step 508, and fed to the second stage HMM 212 at step 510. The Viterbi is again performed, at step 512, now using the HMM of the second stage 212. The result is an asynchronous labeling, at step 514, of the audio into the three segment categories.

The labeled audio segments 336 may now be used more reliably in other functions. For example, there will be fewer errors when transcribing speech from a voice segment because the segments labeled "voice" will only contain voice samples. It also allows for the segmentation of other types of signals in addition to voice. This is desirable in the automatic distribution of signals for further analysis.

ALTERNATIVE EMBODIMENTS

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when loaded and executed, controls the computer system such that it carries out the methods described herein.

The present invention can also be embedded in a computer program product, which comprises all the features enabling the implementation of the methods described herein, and which—when loaded in a computer system—is able to carry out these methods. In the present context, a "computer program" includes any expression, in any language, code or notation, of a set of instructions intended to cause a system having an information processing capability to perform a particular function either directly or after either or both of the following: a) conversion to another language, code, or notation; and b) reproduction in a different material form.

Each system may include one or more computers and a computer readable medium that allows the computer to read data, instructions, messages, or message packets, and other computer readable information from the computer readable medium. The computer readable medium may include non-volatile memory such as ROM, Flash memory, a hard or floppy disk, a CD-ROM, or other permanent storage. Additionally, a computer readable medium may include volatile storage such as RAM, buffers, cache memory, and network circuits. Furthermore, the computer readable medium may include computer readable information in a transitory state medium such as a network link and/or a network interface (including a wired network or a wireless network) that allow a computer to read such computer readable information.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method comprising:
    training an audio analysis system to identify asynchronous segments of audio types using sample data sets, the sample data sets being representative of audio signals observed a target sites, wherein the training step comprises: creating a first hidden Markov model; determining the most likely path through the first hidden Markov model; transforming a state sequence generated by the first hidden Markov model from a 1 dimensional sequence of state labels, to a 2-dimensional input of discrete values, the first value being the state label, and the second value being the duration of the state; and creating a second hidden Markov model using the transformed state sequence as observation inputs; and segmenting asynchronous segments of audio samples into a plurality of categories by cascading hidden Markov models, the audio samples being collected at a target site.

2. The method of claim 1, wherein the creating a first hidden Markov model step comprises:
   transforming a sampled time-domain audio signal into a collection of feature vectors;
   analyzing the collection of feature vectors to produce a statistical model of each of the plurality of categories of audio signals;
   combining the models of each of the plurality of categories of audio signals to form the first hidden Markov model; and
   presenting each of the feature vectors as observation inputs to the first hidden Markov model.

3. The method of claim 2, wherein the feature vector comprises:
   a first field relating to an autocorrelation error;
   a second field relating to harmonicity; and
   a third field relating to tone identification.

4. The method of claim 2, wherein the analyzing step comprises estimating parameters of the statistical models using a Baum-Welch expectation maximization algorithm.

5. The method of claim 2, wherein each statistical model comprises a 2-state ergodic hidden Markov model, having observation probabilities for each state modeled by a Gaussian probability density.

6. The method of claim 1, wherein the determining the most likely path through the first hidden Markov model step comprises performing a Viterbi search.

7. The method of claim 1, wherein the second hidden Markov model comprises:
   models of the plurality of categories wherein each category model used in the first hidden Markov model is used as a subset of other category models.

8. The method of claim 7, wherein the second hidden Markov model further comprises:
   an emission probability of each of the states of the second hidden Markov model representing the duration of the state.

9. The method of claim 1 wherein the plurality of categories comprises voice segments, silence segments, and signal segments.

10. The method of claim 9, further comprising transcribing the voice segments into text.

11. A method comprising:
   training an audio analysis system to identify asynchronous segments of audio types using sample data sets, the sample data sets being representative of audio signals observed at target sites; and
   segmenting asynchronous segments of audio samples into a plurality of categories by cascading hidden Markov models, the audio samples being collected at a target site wherein the segmenting step comprises: loading a sampled time-domain audio signal; transforming the sampled time-domain audio signal into a collection of feature vectors; presenting the feature vectors as observation inputs to a first hidden Markov model; determining the most likely path through the first hidden Markov model; transforming a state sequence generated by the first hidden Markov model from a 1 dimensional sequence of state labels, to a 2-dimensional input of discrete values, the first value being the state label, and the second value being the duration of the state; presenting the transformed state sequence as observation inputs to a second hidden Markov model; determining the most likely path through the second hidden Markov model; and labeling the audio signals according to a plurality of categories.

12. The method of claim 11, wherein the feature vector comprises:
   a first field relating to an autocorrelation error;
   a second field relating to harmonicity; and
   a third field relating to tone identification.

13. The method of claim 11, wherein the determining the most likely path through the first hidden Markov model step comprises performing a Viterbi search.

14. The method of claim 11, wherein the determining the most likely path through the second hidden Markov model step comprises performing a Viterbi search.

15. The method of claim 11, wherein the sampled time-domain audio signal has been previously sampled.

16. The method of claim 11, wherein the time-domain audio signal is being sampled real-time.

17. A system comprising:
   a means for acquiring audio signals; and
   an audio analyzer, communicatively coupled to the means for acquiring audio signals, the audio analyzer comprising:
      a feature extractor for extracting feature vectors from sampled time-domain audio signals;
      a 1st stage hidden Markov model, communicatively coupled to the feature extractor, for providing a state sequence;
      a state sequence transformer, communicatively coupled to the 1st stage hidden Markov model for transforming the state sequence into a 2-dimensional input of discrete values, the first value being the state label, and the second value being the duration of the state; and
      a 2nd stage hidden Markov model, communicatively coupled to the state sequence transformer, for using the transformed state sequence to label the audio signals according to a plurality of categories.

18. The system of claim 17, further comprising a speech transcriber, communicatively coupled to the audio analyzer, for transcribing voice segments into text.

19. A computer readable medium, comprising computer instructions for performing the steps of:
   training an audio analysis system to identify asynchronous segments of audio types using sample data sets, the sample data sets being representative of audio signals observed at target sites, wherein the training step comprises instructions for: creating a first hidden Markov model; determining the most likely path through the first hidden Markov model; transforming a state sequence generated by the first hidden Markov model from a 1 dimensional sequence of state labels, to a 2-dimensional input of discrete values, the first value being the state label, and the second value being the duration of the state; and creating a second hidden Markov model using the transformed state sequence as observation inputs; and
   segmenting asynchronous segments of audio samples into a plurality of categories by cascading hidden Markov models, the audio samples being collected at a target site.

20. The computer readable medium of claim 19, wherein the creating a first hidden Markov model step comprises instructions for:
   transforming a sampled time-domain audio signal into a collection of feature vectors;

analyzing the collection of feature vectors to produce a statistical model of each of the plurality of categories of audio signals;

combining the models of each of the plurality of categories of audio signals to form the first hidden Markov model; and presenting each of the feature vectors as observation inputs to the first hidden Markov model.

21. The computer readable medium of claim 20, wherein the feature vector comprises:
   a first field relating to an autocorrelation error;
   a second field relating to harmonicity; and
   a third field relating to tone identification.

22. The computer readable medium of claim 20, wherein the analyzing step comprises instructions for estimating parameters of the statistical models using a Baum-Welch expectation maximization algorithm.

23. The computer readable medium of claim 20, wherein each statistical model comprises a 2-state ergodic hidden Markov model, having observation probabilities for each state modeled by a Gaussian probability density.

24. The computer readable medium of claim 19, wherein the determining the most likely path through the first hidden Markov model step comprises instructions for performing a Viterbi search.

25. The computer readable medium of claim 24, wherein the second hidden Markov model further comprises:
   an emission probability of each of the states of the second hidden Markov model representing the duration of the state.

26. The computer readable medium of claim 19, wherein the segmenting step comprises instructions for:
   loading a sampled time-domain audio signal;
   transforming the sampled time-domain audio signal into a collection of feature vectors;
   presenting the feature vectors as observation inputs to a first hidden Markov model;
   determining the most likely path through the first hidden Markov model;
   transforming a state sequence generated by the first hidden Markov model from a 1 dimensional sequence of state labels, to a 2-dimensional input of discrete values, the first value being the state label, and the second value being the duration of the state;
   presenting the transformed state sequence as observation inputs to a second hidden Markov model;
   determining the most likely path through the second hidden Markov model; and
   labeling the audio signals according to a plurality of categories.

27. The computer readable medium of claim 26, wherein the feature vector comprises:
   a first field relating to an autocorrelation error;
   a second field relating to harmonicity; and
   a third field relating to tone identification.

28. The computer readable medium of claim 26, wherein the determining the most likely path through the first hidden Markov model step comprises instructions for performing a Viterbi search.

29. The computer readable medium of claim 26, wherein the determining the most likely path through the second hidden Markov model step comprises instructions for performing a Viterbi search.

30. The computer readable medium of claim 26, wherein the sampled time-domain audio signal has been previously sampled.

31. The computer readable medium of claim 26, wherein the time-domain audio signal is being sampled real-time.

32. The computer readable medium of claim 19, wherein the plurality of categories comprises voice segments, silence segments, and signal segments.

33. The computer readable medium of claim 32, further comprising instructions for transcribing the voice segments into text.

34. The computer readable medium of claim 19, wherein the second hidden Markov model comprises:
   models of the plurality of categories wherein each category model used in the first hidden Markov model is used as a subset of other category models.

* * * * *